(12) United States Patent
Gray et al.

(10) Patent No.: US 11,126,467 B2
(45) Date of Patent: Sep. 21, 2021

(54) PROACTIVE LOAD-BALANCING USING RETROACTIVE WORK REFUSAL

(71) Applicant: salesforce.com, inc., San Francisco, CA (US)

(72) Inventors: William Victor Gray, Kitchener (CA); Yogesh Patel, Dublin, CA (US); Shreedhar Sundaram, San Mateo, CA (US); Shaahin Mehdinezhad Rushan, Dublin, CA (US); Mahalaxmi Sanathkumar, San Francisco, CA (US); William Hackett, Vallejo, CA (US); Rajkumar Pellakuru, San Jose, CA (US); Anjani Gupta, Redwood City, CA (US); Chandra S. Chadalavada, Dublin, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 90 days.

(21) Appl. No.: 15/836,670

(22) Filed: Dec. 8, 2017

(65) Prior Publication Data
US 2019/0179673 A1    Jun. 13, 2019

(51) Int. Cl.
*G06F 9/50* (2006.01)
*H04L 12/26* (2006.01)
*H04L 29/08* (2006.01)

(52) U.S. Cl.
CPC .......... *G06F 9/5044* (2013.01); *G06F 9/505* (2013.01); *H04L 43/0817* (2013.01); *H04L 43/0876* (2013.01); *H04L 43/16* (2013.01); *H04L 67/1008* (2013.01); *H04L 67/1012* (2013.01); *H04L 67/1025* (2013.01); *H04L 67/1029* (2013.01); *G06F 9/5083* (2013.01); *G06F 2209/5022* (2013.01); *H04L 29/08171* (2013.01)

(58) Field of Classification Search
None
See application file for complete search history.

(56) References Cited

U.S. PATENT DOCUMENTS

| 5,031,089 A | * | 7/1991 | Liu | G06F 9/5088 |
|---|---|---|---|---|
| | | | | 709/226 |
| 5,249,290 A | * | 9/1993 | Heizer | G06F 9/505 |
| | | | | 709/203 |
| 5,901,334 A | * | 5/1999 | Banks | G06F 9/544 |
| | | | | 710/56 |

(Continued)

*Primary Examiner* — Lewis A Bullock, Jr.
*Assistant Examiner* — Gilles R Kepnang
(74) *Attorney, Agent, or Firm* — Nicholson, De Vos, Webster & Elliott, LLP

(57) ABSTRACT

A method by a computing system implementing a node within a cluster of nodes to load balance among the cluster of nodes using retroactive refusal. Each of the nodes within the cluster of nodes is capable of processing work items. The method includes accepting a work item to be processed by the node, monitoring a resource utilization of the node, determining whether the resource utilization of the node exceeds a predetermined threshold, and retroactively refusing the work item in response to a determination that the resource utilization of the node exceeds the predetermined threshold, wherein the retroactive refusal causes the work item to be reassigned from the node to another node within the cluster of nodes.

10 Claims, 5 Drawing Sheets

(56) References Cited

U.S. PATENT DOCUMENTS

| | | | |
|---|---|---|---|
| 6,711,607 B1* | 3/2004 | Goyal | G06F 9/5044 709/203 |
| 6,963,917 B1* | 11/2005 | Callis | G06F 9/5033 709/227 |
| 7,730,478 B2 | 6/2010 | Weissman | |
| 7,861,247 B1* | 12/2010 | Santos | G06F 9/5011 718/104 |
| 9,513,134 B1* | 12/2016 | Ishikawa | H04W 4/029 |
| 10,282,352 B2 | 5/2019 | Gray | |
| 10,455,264 B2 | 10/2019 | Patel et al. | |
| 2002/0087612 A1* | 7/2002 | Harper | G06F 9/4856 718/100 |
| 2003/0018927 A1* | 1/2003 | Gadir | G06F 11/1484 714/4.11 |
| 2003/0158913 A1* | 8/2003 | Agnoli | H04L 67/1002 709/219 |
| 2005/0234935 A1* | 10/2005 | Barsness | G06F 9/505 |
| 2007/0271570 A1* | 11/2007 | Brown | G06F 9/5033 718/105 |
| 2010/0100886 A1* | 4/2010 | Takagi | G06F 11/1428 718/104 |
| 2010/0296417 A1* | 11/2010 | Steiner | H04L 65/00 370/260 |
| 2011/0239010 A1* | 9/2011 | Jain | G06F 1/3209 713/310 |
| 2012/0324111 A1* | 12/2012 | Barzel | G06F 9/505 709/226 |
| 2014/0237090 A1* | 8/2014 | Lassen | H04L 41/082 709/223 |
| 2015/0121113 A1* | 4/2015 | Ramamurthy | H02J 9/062 713/340 |
| 2015/0142530 A1 | 5/2015 | Motamedi et al. | |
| 2015/0169733 A1 | 6/2015 | Motamedi et al. | |
| 2016/0098292 A1* | 4/2016 | Boutin | G06F 9/505 718/104 |
| 2017/0075713 A1* | 3/2017 | Le Bars | G06F 9/5077 |
| 2017/0252926 A1* | 9/2017 | Wise | B25J 9/1669 |
| 2017/0318099 A1* | 11/2017 | Tolmachev | G06F 9/505 |
| 2018/0074855 A1* | 3/2018 | Kambatla | G06F 9/50 |
| 2019/0147404 A1 | 5/2019 | Lue et al. | |
| 2019/0163791 A1 | 5/2019 | Sanathkumar et al. | |
| 2019/0179673 A1 | 6/2019 | Gray et al. | |
| 2019/0179931 A1 | 6/2019 | Gupta et al. | |
| 2019/0213552 A1 | 7/2019 | Gupta et al. | |
| 2019/0238604 A1 | 8/2019 | Sundaram et al. | |
| 2019/0238605 A1 | 8/2019 | Patel et al. | |
| 2019/0373031 A1 | 12/2019 | Patel et al. | |

\* cited by examiner

PROACTIVE LOAD-BALANCING USING RETROACTIVE WORK REFUSAL

TECHNICAL FIELD

One or more implementations relate to the field of load balancing; and more specifically, to load balancing using retroactive refusal.

BACKGROUND

A cluster is a set of loosely or tightly connected computing units that work together so that, in many respects, they can be viewed as a single system. Clusters are usually deployed to improve performance and availability over that of a single computing unit, while typically being much more cost-effective than single computers of comparable speed or availability. The computing units that are part of a cluster may also be referred to as "nodes."

Conventional load balancing techniques assign work items to nodes within a cluster based on the current state of the nodes. For example, a conventional load balancer may assign an incoming work item to the node in the cluster that currently has the lowest central processing unit (CPU) utilization. This works well for short-running work items as any changes in the cost characteristics of work items will be quickly remediated as the work items are completed. However, for long-running work items, the cost characteristics of each work item can change significantly over the lifetime of the work item, which can result in an unbalanced distribution of work items in the cluster.

For example, consider the system shown in FIG. 1, which includes a load balancer 120 and a cluster 110 that includes two nodes 100 (node 100A and node 100B). At time T0, each node 100 has 1 work item assigned and each node 100 is running at 50% CPU utilization. At time T1, the load balancer 120 assigns an incoming work item W to node 100A (e.g., load balancer 120 may have chosen node 100A using a tie-breaking mechanism since both node 100A and node 100B have the same CPU utilization). At time T2, node 100B finishes processing its work item and thus is left with no work items (it is idle). At time T3, work item W becomes very resource intensive (e.g., it is processing new data for a new organization and a large import/update happens). Now node 100A is over-utilized (trying to process work items A and W) and node 100B is under-utilized (idle). This unbalance happens because load balancing decisions are made when a work item is initially assigned, and does not take into account the change in cost characteristic of the work item after it has been assigned to a node 100. This has the disadvantages that work items being processed by over-utilized nodes 100 (e.g., node 100A) are processed more slowly (time cost) and that some nodes 100 (e.g., node 100B) may be under-utilized or idle (monetary cost). Conventional auto-scaling techniques may "spin up" additional nodes 100 in an attempt to ameliorate the situation, but this will not be effective since work items have already been assigned so the newly "spun up" nodes will also stay idle. If work items are long-running and highly dynamic (in terms of their cost characteristics), then the cluster will quickly become unbalanced.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

The following description describes methods and apparatus for load balancing using retroactive refusal. According to some implementations, a node within a cluster monitors its own resource utilization. If the node determines that its resource utilization exceeds a predetermined threshold, then the node retroactively refuses a work item so that the work item can be reassigned to another node (e.g., to a node that is being under-utilized). Such proactive load balancing using retroactive refusal allows for a more balanced distribution of work items within the cluster compared to conventional load balancing techniques, where work items cannot be reassigned once they have been assigned to a given node.

Figure 1:
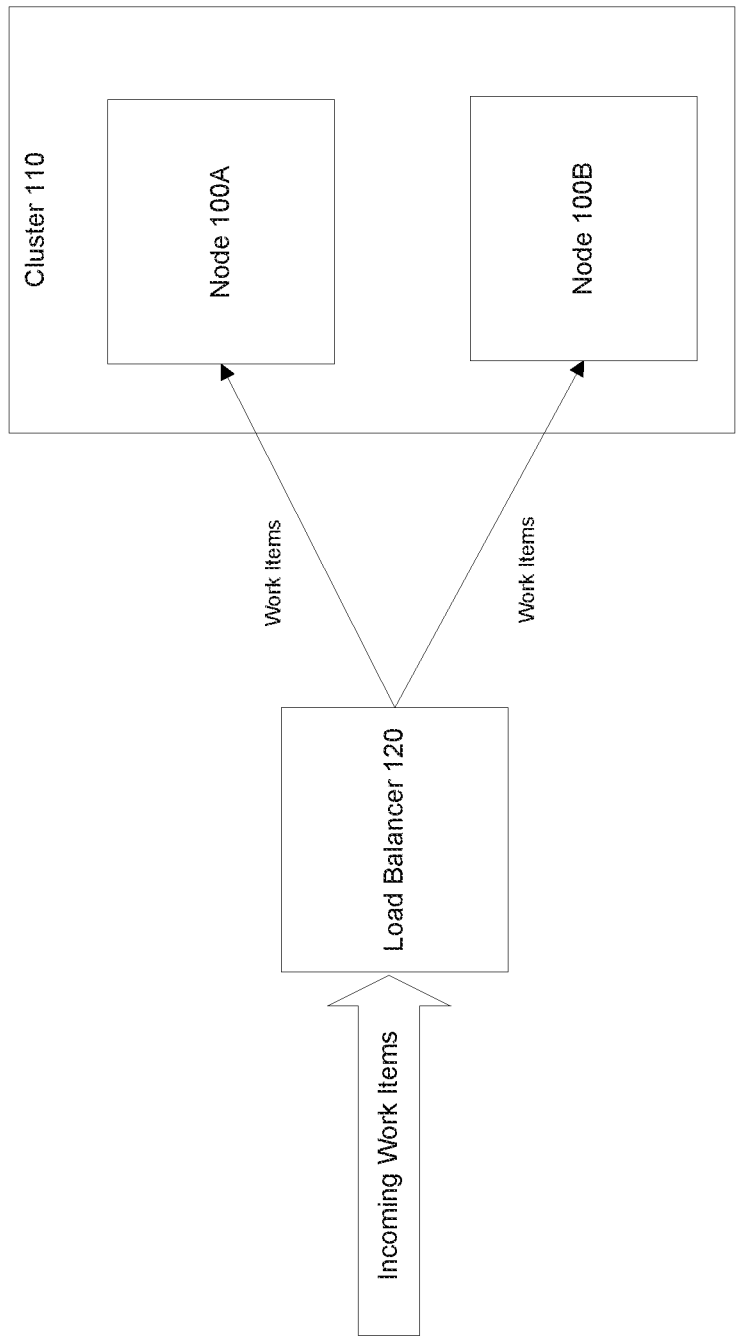
FIG. 1 is a block diagram of a system in which conventional load balancing can be implemented, according to some implementations.
Figure 2:
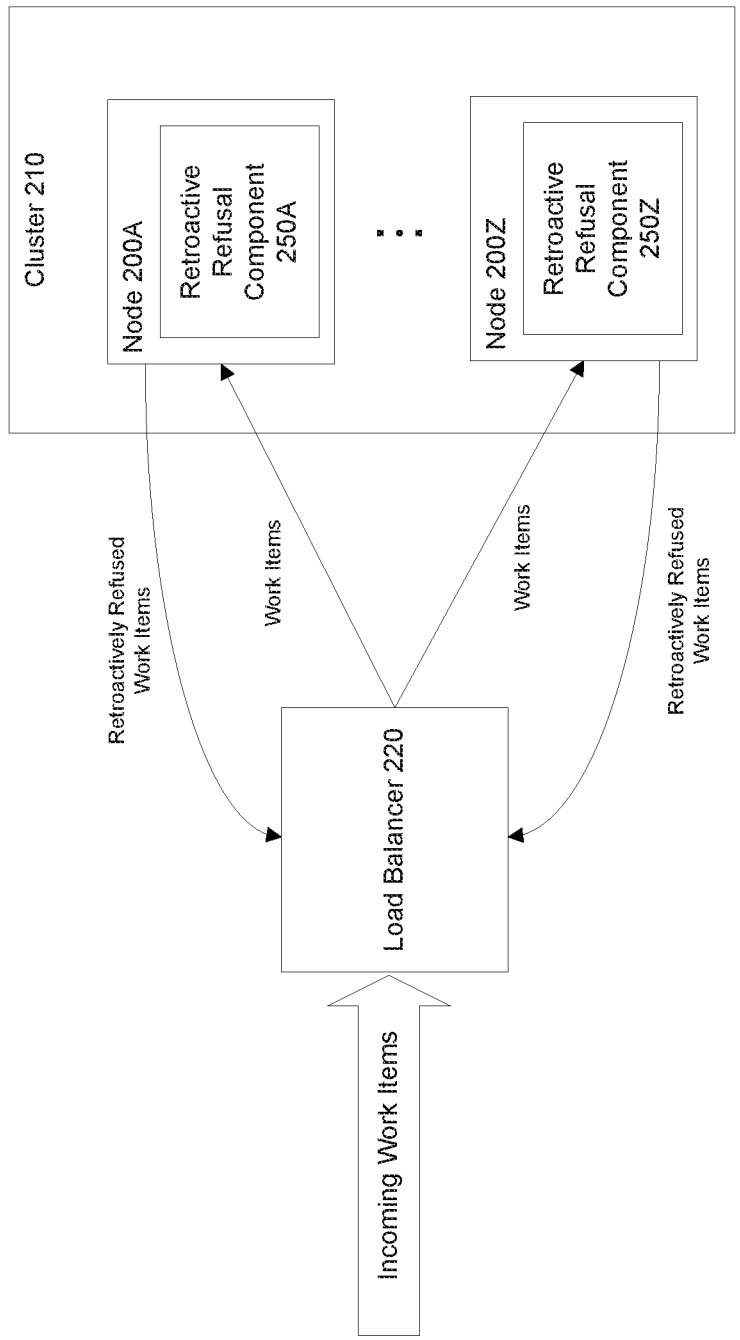
FIG. 2 is a block diagram of a system in which load balancing using retroactive refusal can be implemented, according to some implementations.

FIG. 2 is a block diagram of a system in which load balancing using retroactive refusal can be implemented, according to some implementations. In an implementation, as shown in the diagram, the system includes a cluster 210 of nodes 200 and a load balancer 220. The cluster 210 includes a set of nodes 200A-Z. As used herein, a "node" refers to a physical or virtual computing unit (e.g., server, virtual machine (VM), a cloud computing resource, etc.) that is capable of processing work items. The nodes 200 within the cluster 210 may work together on a common overarching computing task, which may be divided into one or more work items. As used herein, a "work item" refers to a discrete computing task (e.g., which may involve a data processing task such as data calculation, manipulation, transformation, and/or coordination). For example, a computing task may involve handling data processing (e.g., data migration, log processing, or video processing) for data belonging to different users/entities. This computing task may be divided into work items such that each work item handles the data processing for a single one of the user/entities. The load balancer 220 is configured to assign/distribute work items to nodes 200 in the cluster 210. In an implementation, the load balancer 220 assigns work items to nodes 200 within the cluster 210 based on the current resource utilization of the nodes 200. For example, the load balancer 220 may assign a work item to the node 200 in the cluster 210 that currently has the lowest CPU utilization, input/output (I/O) utilization, network bandwidth utilization, or any combination thereof. As used herein, "resource utilization" generally refers to the amount of resources that are being utilized compared to some baseline amount (e.g., the baseline amount could be the total amount of resources available or the total amount of resources that have been allocated for a particular node 200 or task).

As mentioned above, the cost characteristics of a work item (e.g., how resource intensive the work item is in terms of the amount of CPU, IO, and/or time required to process the work item) can change after the work item is assigned to a node 200. This is typically the case when the work item involves processing data as it is being generated. The work item for a data processing task can become more resource intensive or less resource intensive (e.g., computationally) depending on the amount of data being generated for the data processing task, and this can change throughout the lifetime of the work item (which can be very long or even indefinite). For example, for processing live video streams with motion tracking, the amount of data being generated depends on the amount of motion in the video. As another example, for log processing of user activity, the amount of data being generated can vary depending on the amount of user activity (which can vary by day, time, etc.). The cost characteristic of a work item can be difficult to predict at the time the work item is initially being assigned to a node 200. Conventional load balancing techniques assign work items to nodes 200 in a cluster 210 based on the current resource utilization of those nodes 200. However, once a work item is assigned to a node 200, it cannot be reassigned. Thus, if a work item assigned to a node 200 suddenly becomes more resource intensive, there is no way to redistribute the already assigned work item. As mentioned above, this may lead to an unbalanced cluster 210 where some nodes 200 are over-utilized, while other nodes 200 are under-utilized. This problem may be more pronounced for systems that have long-running and highly dynamic (in terms of cost characteristics) work items. As will be described in further detail herein, implementations may use the concept of retroactive refusal to achieve a more balanced cluster 210.

In an implementation, each node 200 within the cluster 210 includes a retroactive refusal component 250 (e.g., node 200A includes retroactive refusal component 250A and node 200Z includes retroactive refusal component 250Z). In an implementation, the retroactive refusal component 250 of a node 200 monitors the resource utilization of that node 200 and determines when the resource utilization of that node 200 exceeds a predetermined threshold. The predetermined threshold can be a static threshold (e.g., set by the administrator of the cluster 210) or a dynamic threshold (that changes over time). The resource utilization can include CPU utilization, I/O utilization, network bandwidth utilization, or any combination thereof. In an implementation, when the resource utilization of the node 200 exceeds the predetermined threshold, the retroactive refusal component 250 of the node 200 retroactively refuses a work item so that the work item can be reassigned to another node 200 within the cluster 210. As used herein, "retroactive refusal" refers to refusing a work item after it has been assigned to a node 200 (e.g., after the node 200 has accepted the work item). In an implementation, as shown in the diagram, retroactive refusal involves terminating the work item and sending the retroactively refused work item to the load balancer 220 (e.g., into a queue from which the load balancer 220 assigns work items from). The load balancer 220 can then reassign the work item to another node 200 within the cluster 210 based on the current resource utilization of the nodes 200 within the cluster 210. In an implementation, when a work item is to be retroactively refused, the priority of the work item is set to be higher than the current priority of the work item so that the work item can be assigned and/or processed more quickly after it has been retroactively refused (e.g., compared to new incoming work items that have not been retroactively refused). Such proactive load balancing using retroactive refusal allows for a more balanced distribution of work items within the cluster 210 compared to conventional load balancing techniques, where work items cannot be reassigned once they have been assigned to a given node 200. While in some implementations each node 200 within the cluster 210 includes a retroactive refusal component 250 to perform load balancing using retroactive refusal, in other implementations, only some of the nodes 200 may include a retroactive refusal component 250 to perform load balancing using retroactive refusal.

While the diagram shows a load balancer 220, some implementations may implement load balancing without employing a load balancer 220. For example, each node 200 within the cluster 210 may be responsible for picking up its own work items to process (e.g., from a queue of unassigned work items). In such an implementation, the retroactive refusal may involve marking a work item (previously assigned to the node 200) as being unassigned to allow the work item to be picked up by another node 200 within the cluster 210.

In general, load balancing using retroactive refusal will trend toward resource intensive work items running by themselves (or with just a few other work items) on a given node 200 while other nodes 200 process several less resource intensive work items. This enables a much simpler cluster 210 implementation where each node 200 need only have the resources to process one resource intensive work item. Also, load balancing using retroactive refusal prevents one resource intensive work item from adversely affecting many other less resource intensive work items (e.g., since the less resource intensive work items that are being processed by the same node 200 as the resource intensive work item can be retroactively refused and reassigned to another node 200). This improves performance, reduces cost, improves fairness, and improves reliability.

Figure 3:
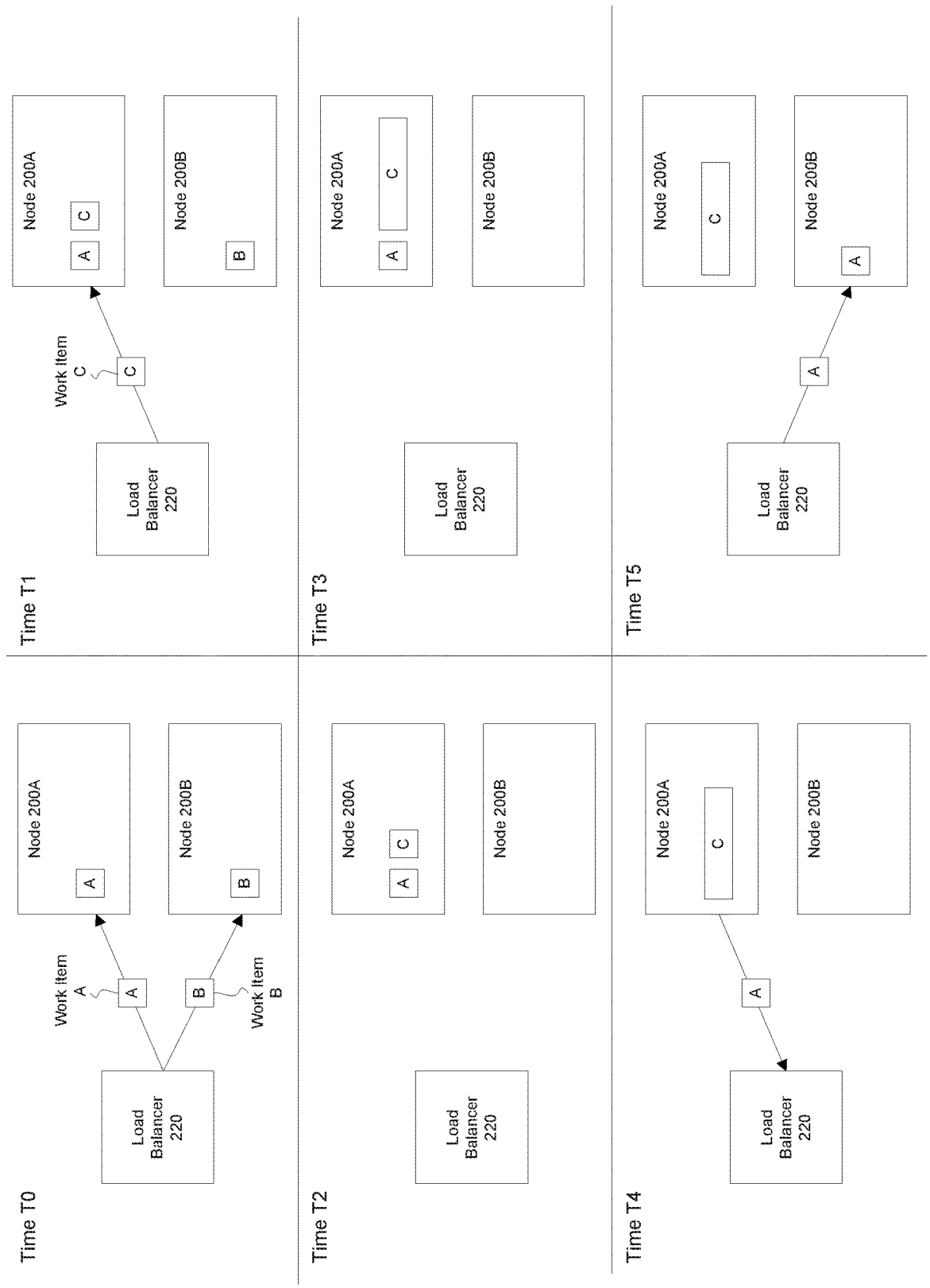
FIG. 3 is a diagram illustrating an exemplary scenario where load balancing using retroactive refusal results in a more balanced distribution of work items within a cluster of nodes, according to some implementations.

FIG. 3 is a diagram illustrating an exemplary scenario where load balancing using retroactive refusal results in a more balanced distribution of work items within a cluster of nodes, according to some implementations. In this exemplary scenario, times T0, T1, T2, T3, and T5 represent the progression of time in that order. At time T0, the load balancer 220 assigns work item A to node 200A and work item B to node 200B. At time T1, the load balancer 220 assigns work item C to node 200A (e.g., because node 200A currently has lower CPU utilization compared to node 200B). At time T2, node 200B finishes processing work item B. At time T3, work item C becomes very resource intensive (e.g., it is processing new data for a new organization and a large import/update happens), which is represented in the drawing by work item C becoming elongated. At time T4, node 200A recognizes that its resource utilization has exceeded a predetermined threshold (e.g., caused by work item C becoming resource intensive), and as a result retroactively refuses work item A, which causes work item A to be sent back to the load balancer 220 for reassignment. At time T5, the load balancer 220 reassigns work item A to node 200B. As can be seen from this exemplary scenario, the retroactive refusal allows for a more balanced distribution of work items within the cluster 210 compared to conventional load balancing techniques. In the same scenario with conventional load balancing techniques (that do not use retroactive refusal), node 200A would be over-utilized trying to process both work item A and work item C, even though node 200B is idle, and being under-utilized.

Figure 4:
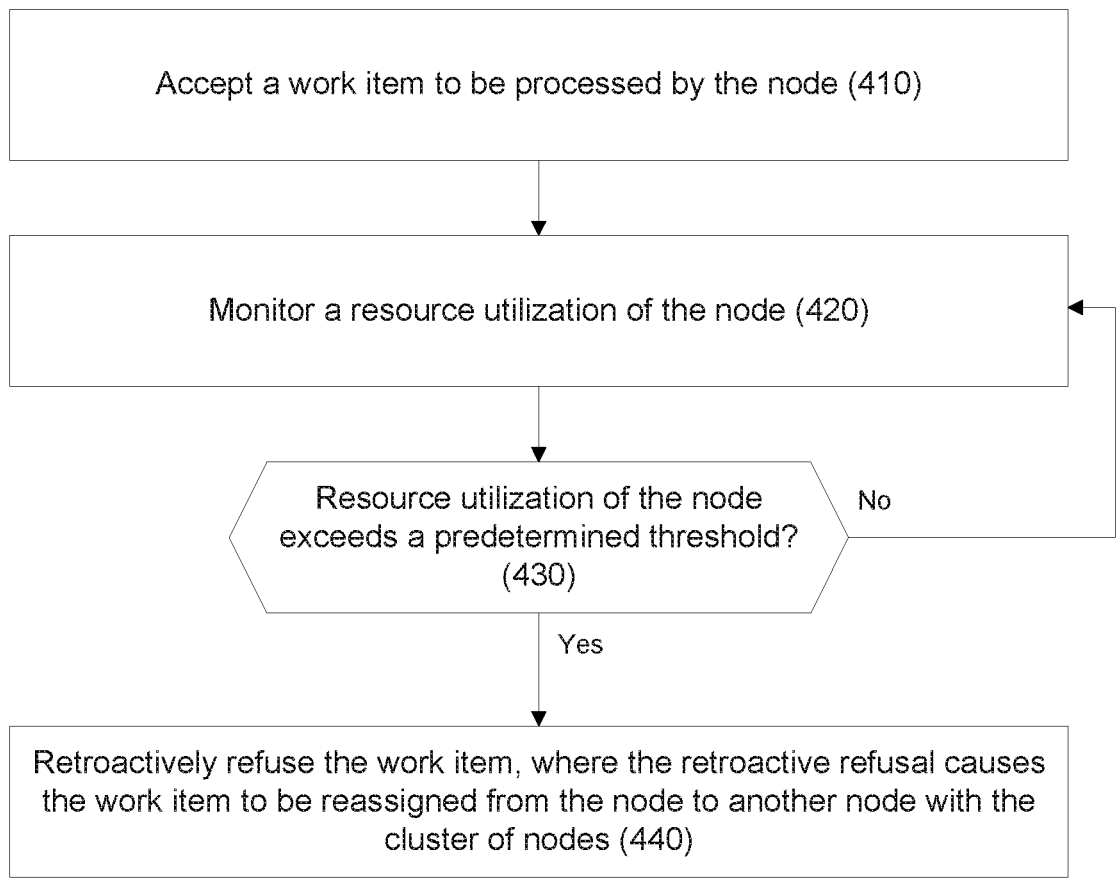
FIG. 4 is a flow diagram of a process for load balancing using retroactive refusal, according to some implementations.

FIG. 4 is a flow diagram of a process for load balancing using retroactive refusal, according to some implementations. In one implementation, the process is performed by a computing device/system implementing a node 200 within a cluster 210 (e.g., where the node 200 implements a retroactive refusal component 250). The operations in the flow diagram will be described with reference to the exemplary implementations in the other figures. However, the operations of the flow diagram can be performed by implementations other than those discussed with reference to the other figures, and the implementations discussed with reference to these other figures can perform operations different than those discussed with reference to the flow diagram. While the flow diagram shows a particular order of operations performed by certain implementations, it should be understood that such order is exemplary (e.g., alternative implementations may perform the operations in a different order, combine certain operations, overlap certain operations, etc.).

At block 410, the node 200 accepts a work item to be processed by the node 200 (e.g., accepting an assignment from a load balancer 220 or the node 200 picking up a work item from a queue). At block 420, the node 200 monitors a resource utilization of the node 200 (e.g., CPU utilization). At decision block 430, the node 200 determines whether the resource utilization of the node 200 exceeds a predetermined threshold. If the node 200 determines that the resource utilization of the node 200 does not exceed the predetermined threshold, then the node 200 continues to monitor the resource utilization of the node 200 (return to block 420). However, if the node 200 determines that the resource utilization of the node 200 exceeds the predetermined threshold, then the node 200 retroactively refuses the work item, where the retroactive refusal causes the work item to be reassigned from the node 200 to another node 200 within the cluster 210 of nodes 200.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Figure 5A:
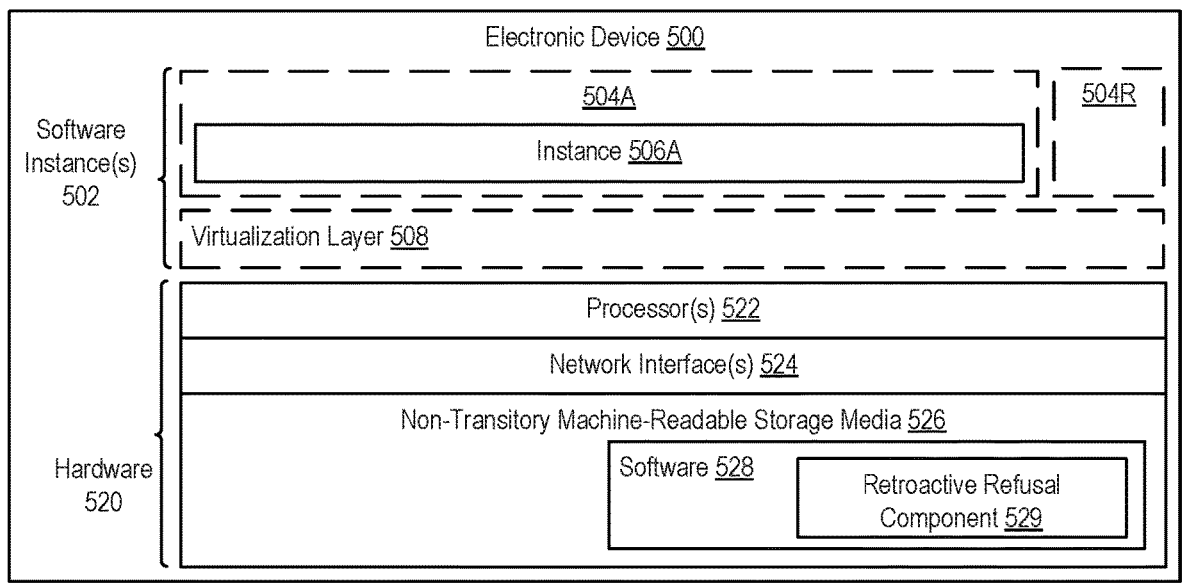
FIG. 5A is a block diagram illustrating an electronic device, according to some implementations.

FIG. 5A is a block diagram illustrating an electronic device, according to some implementations. Electronic device 500 includes hardware 520 comprising a set of one or more processor(s) 522, a set of one or more network interfaces 524 (wireless and/or wired), and non-transitory machine-readable storage media 526 having stored therein software 528 (which includes instructions executable by the set of one or more processor(s) 522). Each of the previously described nodes 200 (including the retroactive refusal component 250 of that node 200) may be implemented in one or more electronic devices 500. In one implementation, one or more of the nodes 200 within a cluster 210 are each implemented in a separate one of the electronic devices 500 (e.g., where the retroactive refusal component 529 included in software 528 represents the software to implement load balancing using retroactive refusal). Alternatively or additionally, in one implementation, multiple nodes are implemented in the same electronic device 500 (e.g., multiple VMs running on the same electronic device 500, where each VM functions as a node 200). In one implementation, the load balancer 220 is implemented in one or more electronic devices 500. Other configurations of electronic devices may be used in other implementations.

In electronic devices that use compute virtualization, the set of one or more processor(s) 522 typically execute software to instantiate a virtualization layer 508 and software container(s) 504A-R (e.g., with operating system-level virtualization, the virtualization layer 508 represents the kernel of an operating system (or a shim executing on a base operating system) that allows for the creation of multiple software containers 504A-R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 528 (illustrated as instance 506A) is executed within the software container 504A on the virtualization layer 508. For example, an instance of retroactive refusal component 529 included in software 528 may be executed within the software container 504A to implement load balancing using retroactive refusal, as described herein. In electronic devices where compute virtualization is not used, the instance 506A on top of a host operating system is executed on the "bare metal" electronic device 500. The instantiation of the instance 506A, as well as the virtualization layer 508 and software containers 504A-R if implemented, are collectively referred to as software instance(s) 502.

Alternative implementations of an electronic device may have numerous variations from that described above. For example, customized hardware and/or accelerators might also be used in an electronic device.

Figure 5B:
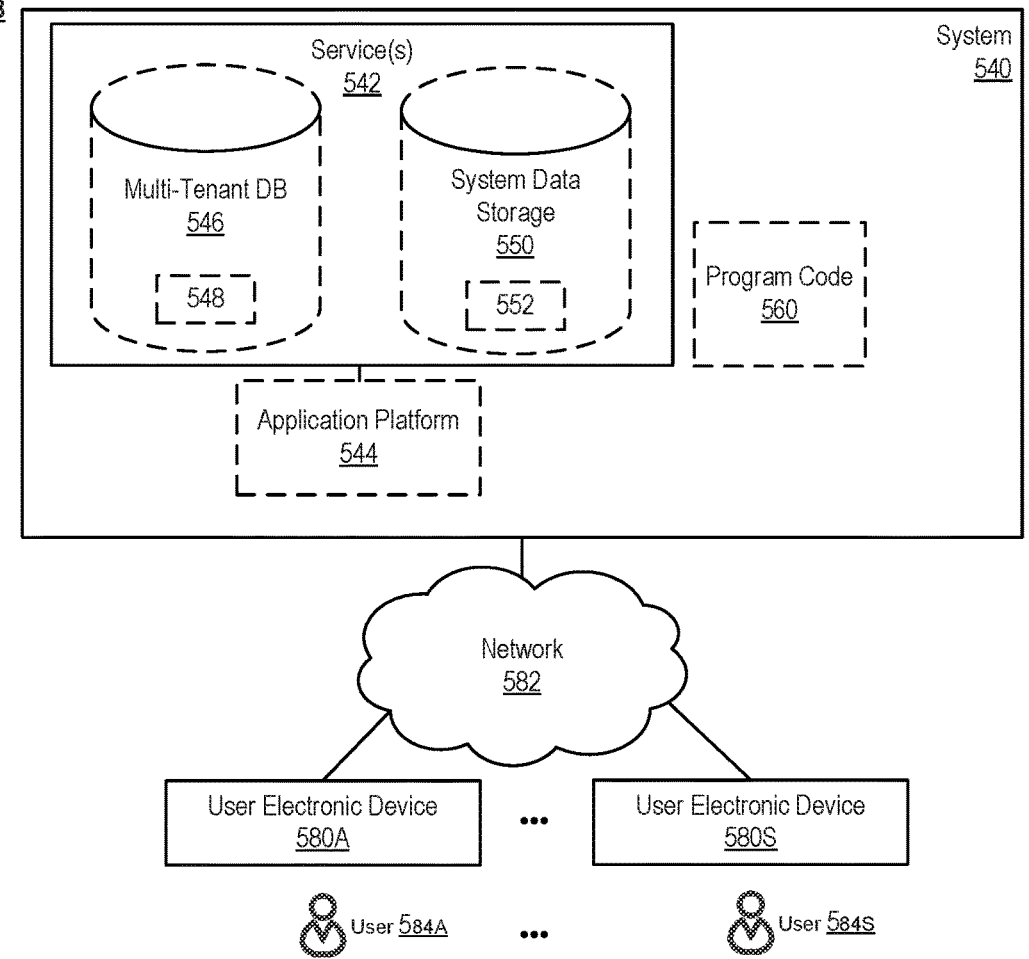
FIG. 5B is a block diagram of an environment where load balancing using retroactive refusal can be employed, according to some implementations.

FIG. 5B is a block diagram of an environment where load balancing using retroactive refusal can be employed, according to some implementations. A system 540 includes hardware (a set of one or more electronic devices) and software to provide service(s) 542. The system 540 is coupled to user electronic devices 580A-S over a network 582. The service(s) 542 may be on-demand services that are made available to one or more of the users 584A-S working for one or more other organizations (sometimes referred to as outside users) so that those organizations do not need to necessarily be concerned with building and/or maintaining a system, but instead makes use of the service(s) 542 when needed (e.g., on the demand of the users 584A-S). The service(s) 542 may communicate with each other and/or with one or more of the user electronic devices 580A-S via one or more Application Programming Interface(s) (APIs) (e.g., a Representational State Transfer (REST) API). The user electronic devices 580A-S are operated by users 584A-S.

In one implementation, the system 540 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user electronic devices 580A-S communicate with the server(s) of system 540 to request and update tenant-level data and system-level data hosted by system 540, and in response the system 540 (e.g., one or more servers in system 540) may automatically generate one or more Structured Query Language (SQL) statements (e.g., one or more SQL queries) that are designed to access the desired information from the one or more multi-tenant database 546 and/or system data storage 550.

In some implementations, the service(s) 542 are implemented using virtual applications dynamically created at run time responsive to queries from the user electronic devices 580A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

In some implementations, computing tasks for providing one or more service(s) 542 are performed by a cluster 210 of nodes 200, where one or more of the nodes 200 within the cluster 210 implement load balancing using retroactive refusal, as described herein.

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 540 and the user electronic devices 580A-S.

Each user electronic device 580A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 540. For example, the user interface device can be used to access data and applications hosted by system 540, and to perform searches on stored data, and otherwise allow a user 584 to interact with various GUI pages that may be presented to a user 584. User electronic devices 580A-S might communicate with system 540 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 580A-S might include an HTTP client, commonly referred to as a "browser," for sending and receiving HTTP messages to and from server(s) of system 540, thus allowing users 584 of the user electronic device 580A-S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method by a computing system implementing a cluster of nodes to load balance among the cluster of nodes using retroactive refusal, each of the nodes within the cluster of nodes capable of processing work items, the method comprising:
    accepting, by a first node within the cluster of nodes, a work item to be processed by the first node;
    processing the work item on the first node, wherein the work item is a discrete computing task and processing of the work item involves executing computer code to process dynamically generated data pertaining to the discrete computing task as the data is being generated;
    during the processing of the work item on the first node, monitoring a resource utilization of the first node;
    determining whether the resource utilization of the first node exceeds a predetermined threshold;
    determining that the work item is to be retroactively refused by the first node in response to a determination that the resource utilization of the first node exceeds the predetermined threshold;
    setting, by the first node, a priority of the work item to a first priority that is higher than a current priority of the work item in response to the determination that the work item is to be retroactively refused by the first node, wherein the current priority of the work item is a priority with which the work item was accepted by the first node for processing and the work item is to be reassigned to another node within the cluster of nodes for processing using the first priority after the work item is retroactively refused by the first node;
    subsequent to the first node setting the priority of the work item to the first priority, retroactively refusing, by the first node, the work item, wherein the retroactive refusing by the first node includes:
        terminating the work item;
        marking the work item as being unassigned; and
        moving the work item to a pool of unassigned work items to be picked up and accepted by another node within the cluster of nodes using the first priority;
    picking up and accepting, by a second node within the cluster of nodes, the work item from the pool of unassigned work items ahead of other unassigned work items in the pool of unassigned work items having a lower priority than the first priority;
    subsequent to the second node picking up and accepting the work item, processing the work item on the second node, which involves executing computer code;
    during the processing of the work item on the second node, setting, by the second node, the priority of the work item to a second priority that is higher than the first priority, in response to a determination that the work item is to be retroactively refused by the second node; and
    subsequent to the second node setting the priority of the work item to the second priority, retroactively refusing, by the second node, the work item, wherein the retroactive refusing by the second node includes:

terminating the work item;
marking the work item as being unassigned; and
moving the work item to the pool of unassigned work items.

2. The method of claim 1, wherein the resource utilization includes any one of: a central processing unit (CPU) utilization, an input/output (I/O) utilization, and a network bandwidth utilization.

3. The method of claim 1, wherein the work item includes a video processing task or a log processing task.

4. The method of claim 1, wherein the work item is assigned to the first node by a load balancer.

5. A computing system configured to implement a cluster of nodes that provides load balancing among the cluster of nodes using retroactive refusal, each of the nodes within the cluster of nodes capable of processing work items, the computing system comprising:
one or more processors; and
a non-transitory machine-readable storage medium having instructions stored therein, which when executed by the one or more processors, causes the computing system to:
accept, by a first node within the cluster of nodes, a work item to be processed by the first node;
process the work item on the first node, wherein the work item is a discrete computing task and the processing of the work item involves a further step to execute computer code to process dynamically generated data pertaining to the discrete computing task as the data is being generated;
during the processing of the work item on the first node, monitor a resource utilization of the first node;
determine whether the resource utilization of the first node exceeds a predetermined threshold;
determine that the work item is to be retroactively refused by the first node in response to a determination that the resource utilization of the first node exceeds the predetermined threshold;
set, by the first node, a priority of the work item to a first priority that is higher than a current priority of the work item in response to the determination that the work item is to be retroactively refused by the first node, wherein the current priority of the work item is a priority with which the work item was accepted by the first node for processing and the work item is to be reassigned to another node within the cluster of nodes for processing using the first priority after the work item is retroactively refused by the first node;
subsequent to the first node setting the priority of the work item to the first priority, retroactively refuse, by the first node, the work item, wherein the retroactive refusing by the first node includes:
terminate the work item;
mark the work item as being unassigned; and
move the work item to a pool of unassigned work items to be picked up and accepted by another node within the cluster of nodes using the first priority;
pick up and accept, by a second node within the cluster of nodes, the work item from the pool of unassigned work items ahead of other unassigned work items in the pool of unassigned work items having a lower priority than the first priority;
subsequent to the second node picking up and accepting the work item, process the work item on the second node, which involves executing computer code;
during the processing of the work item on the second node, set, by the second node, the priority of the work item to a second priority that is higher than the first priority, in response to a determination that the work item is to be retroactively refused by the second node; and
subsequent to the second node setting the priority of the work item to the second priority, retroactively refuse, by the second node, the work item, wherein the retroactive refusing by the second node includes:
terminate the work item;
mark the work item as being unassigned; and
move the work item to the pool of unassigned work items.

6. The computing system of claim 5, wherein the resource utilization includes any one of: a central processing unit (CPU) utilization, an input/output (I/O) utilization, and a network bandwidth utilization.

7. The computing system of claim 5, wherein the work item is assigned to the first node by a load balancer.

8. A non-transitory machine-readable storage medium having instructions stored therein, which when executed by one or more processors of a computing system implementing a cluster of nodes, causes the computing system to perform operations for providing load balancing among the cluster of nodes using retroactive refusal, each of the nodes within the cluster of nodes capable of processing work items, the operations comprising:
accepting, by a first node within the cluster of nodes, a work item to be processed by the first node;
processing the work item on the first node, wherein the work item is a discrete computing task and processing of the work item involves executing computer code to process dynamically generated data pertaining to the discrete computing task as the data is being generated;
during the processing of the work item on the first node, monitoring a resource utilization of the first node;
determining whether the resource utilization of the first node exceeds a predetermined threshold;
determining that the work item is to be retroactively refused by the first node in response to a determination that the resource utilization of the first node exceeds the predetermined threshold;
setting, by the first node, a priority of the work item to a first priority that is higher than a current priority of the work item in response to the determination that the work item is to be retroactively refused by the first node, wherein the current priority of the work item is a priority with which the work item was accepted by the first node for processing and the work item is to be reassigned to another node within the cluster of nodes for processing using the first priority after the work item is retroactively refused by the first node;
subsequent to the first node setting the priority of the work item to the first priority, retroactively refusing, by the first node, the work item, wherein the retroactive refusing by the first node includes:
terminating the work item;
marking the work item as being unassigned; and
moving the work item to a pool of unassigned work items to be picked up and accepted by another node within the cluster of nodes using the first priority;
picking up and accepting, by a second node within the cluster of nodes, the work item from the pool of unassigned work items ahead of other unassigned work items in the pool of unassigned work items having a lower priority than the first priority;

subsequent to the second node picking up and accepting the second node, processing the work item on the second node, which involves executing computer code;

during the processing of the work item on the work item, setting, by the second node, the priority of the work item to a second priority that is higher than the first priority, in response to a determination that the work item is to be retroactively refused by the second node; and subsequent to the second node setting the priority of the work item to the second priority, retroactively refusing, by the second node, the work item, wherein the retroactive refusing by the second node includes:
terminating the work item;
marking the work item as being unassigned; and
moving the work item to the pool of unassigned work items.

9. The non-transitory machine-readable storage medium of claim 8, wherein the resource utilization includes any one of: a central processing unit (CPU) utilization, an input/output (I/O) utilization, and a network bandwidth utilization.

10. The non-transitory machine-readable storage medium of claim 8, wherein the work item is assigned to the first node by a load balancer.

* * * * *